United States Patent
Shao et al.

(10) Patent No.: US 11,119,016 B2
(45) Date of Patent: Sep. 14, 2021

(54) IMAGE MEASUREMENT DEVICE AND METHOD FOR THE SURFACE DEFORMATION OF SPECIMEN BASED ON SUB-PIXEL CORNER DETECTION

(71) Applicants: SUZHOU H-C SOIL & WATER SCIENCE AND TECHNOLOGY CO., LTD, Jiangsu (CN); DALIAN UNIVERSITY OF TECHNOLOGY, Dalian (CN)

(72) Inventors: Longtan Shao, Dalian (CN); Xiaoxia Guo, Dalian (CN); Yonglu Liu, Dalian (CN); Chuan Huang, Dalian (CN); Mingming Wu, Dalian (CN); Xicheng Li, Dalian (CN); Pingxin Xia, Dalian (CN); Peng Ju, Dalian (CN); Xiao Liu, Dalian (CN); Chun Wang, Dalian (CN); Jie Xue, Dalian (CN); Ying Wang, Dalian (CN)

(73) Assignees: Suzhou H-C Soil & Water Science and Technology Co., Ltd, Jiangsu (CN); Dalian University of Technology, Dalian (CN)

(*) Notice: Subject to any disclaimer, the term of this patent is extended or adjusted under 35 U.S.C. 154(b) by 72 days.

(21) Appl. No.: 16/648,177

(22) PCT Filed: Oct. 18, 2017

(86) PCT No.: PCT/CN2017/106693
§ 371 (c)(1),
(2) Date: Mar. 17, 2020

(87) PCT Pub. No.: WO2019/075661
PCT Pub. Date: Apr. 25, 2019

(65) Prior Publication Data
US 2020/0264082 A1 Aug. 20, 2020

(51) Int. Cl.
*G01N 3/06* (2006.01)
*G06T 7/579* (2017.01)
(Continued)

(52) U.S. Cl.
CPC ............. *G01N 3/068* (2013.01); *G06T 7/246* (2017.01); *G06T 7/579* (2017.01); *G06T 7/68* (2017.01);
(Continued)

(58) Field of Classification Search
CPC .. G01N 3/068; G01N 2203/0647; G01N 3/02; G01N 3/06; G01N 3/08;
(Continued)

(56) References Cited

U.S. PATENT DOCUMENTS

| 8,472,000 B1* | 6/2013 | Lemmon | G03B 15/06 352/50 |
| 2017/0336600 A1* | 11/2017 | Segawa | G02B 13/009 |
| 2017/0366747 A1* | 12/2017 | Wen | H04N 5/2621 |

FOREIGN PATENT DOCUMENTS

| CN | 103344501 A | 10/2013 |
| CN | 104614256 A | 5/2015 |

(Continued)

OTHER PUBLICATIONS

Shao et al. ("Application of the Digital Image Measuring Technique to the Soil Triaxial Test", Rock and Soil Mechanics, vol. 36, Supp. 1, Jun. 2015).*
(Continued)

*Primary Examiner* — Dakshesh D Parikh
(74) *Attorney, Agent, or Firm* — Muncy, Geissler, Olds & Lowe, P.C.

(57) ABSTRACT

A digital image measurement device and method for the surface deformation of specimen based on sub-pixel corner detection is disclosed. This digital image measurement
(Continued)

device is composed of a new type of image pressure cell, a complementary metal-oxide-semiconductor (CMOS) camera, a camera bracket, a flexible lens hood, a computer and matching measurement software. This method discretizes the specimen into several four-node finite elements by printing grids on the specimen and takes corners of the grids as the nodes of the finite elements; tracks the deformation of the feature points in real time by edge detection and corner detection based on sub-pixel; captures the deformation of the whole surface of the specimen by the two flat mirrors which are at an 120° angle behind the specimen; achieves the observation of the deformation of the whole surface by conducting splicing and error correction on the three images.

3 Claims, 3 Drawing Sheets

(51) Int. Cl.
G06T 7/68 (2017.01)
G06T 7/246 (2017.01)
H04N 5/225 (2006.01)

(52) U.S. Cl.
CPC . *H04N 5/2254* (2013.01); *G06T 2207/10148* (2013.01); *G06T 2207/30172* (2013.01)

(58) Field of Classification Search
CPC . G06T 2207/10148; G06T 2207/30172; G06T 7/246; G06T 7/579; G06T 7/68; H04N 5/2254

See application file for complete search history.

(56) References Cited

FOREIGN PATENT DOCUMENTS

| CN | 106840850 | * | 6/2017 | ............... G01N 3/02 |
| CN | 106840850 A | | 6/2017 | |
| CN | 106990803 A | | 7/2017 | |
| GB | 2 258 734 B | | 2/1993 | |
| KR | 10-0486837 B1 | | 4/2005 | |

OTHER PUBLICATIONS

Shao, Longtan, et al., "Application of digital image processing technique to measuring specimen deformation in triaxial test" Rock and Soil Mechanics, Jun. 10, 2015, vol. No. 36, pp. 674-683.

Liu, Xiao, "Method of Whole Surface Deformation Measurement for Soil Specimen in Triaxial Tests and Its Application," Chinese Doctoral Dissertations Full-text Database, Nov. 30, 2012, pp. 15-62.

* cited by examiner

IMAGE MEASUREMENT DEVICE AND METHOD FOR THE SURFACE DEFORMATION OF SPECIMEN BASED ON SUB-PIXEL CORNER DETECTION

TECHNICAL FIELD

The present invention belongs to the technical field of digital image measurement and geotechnical test and relates to a digital image measurement device and method for the surface deformation of specimen based on sub-pixel corner detection.

TECHNICAL BACKGROUND

Deformation measurement of specimen is one of the most important tasks in experimental mechanics, which is also the main task of geotechnical test. Traditional specimen deformation measurements widely adopt the strain gauge, hall-effect type sensor, local deformation measurement sensor, eddy current sensor and other measurement methods. These measurement methods have some disadvantages, such as: (1) overall deformation measurement, (2) contact the specimen and (3) low measurement accuracy or insufficient test points. Not only that, the traditional measurement methods cannot get the whole deformation image of the specimen, nor the strain field of the deformation of local arbitrary point, therefore these methods are difficult to apply to the study on local deformation properties of specimen. Furthermore, in the measurement environment under some special conditions, there will be higher requirements for measurement method. For instance, when measuring the deformation of a soil specimen in a water pressure vessel, traditional measurement method could disturb the sensitive specimen, and it is difficult to operate in an underwater pressure environment. Therefore, in the modern measurement technology based on traditional measurement, optical measurement is the most widely used method.

Optical measurement has many advantages such as non-contact, fast response, high precision, wide range and automation, and has been widely used in many fields. Optical measurement is divided into interferometric optical measurement and non-interference optical measurement. Interferometric optical measurement techniques include holographic interference, speckle interference, moire interference, etc. Non-interference optical measurement techniques include geometric moire technology and digital image measurement technology. Among them, the digital image measurement technology has been developed rapidly due to its strong applicability to measurement environment and simple operation. The application of optical measurement technology in the study of deformation characteristics of materials has promoted the research progress of the mechanical properties and behaviors of the materials. In the field of geotechnical engineering test, the volume deformation and radial deformation measurement of unsaturated soil specimens have always been a problem, however, the digital image measurement method provides an effective solution.

SUMMARY OF THE INVENTION

Aiming at the existing technical problems, the present invention provides a measurement device and method for the surface deformation of specimen of the geotechnical triaxial test based on the sub-pixel accuracy detection of the marking point on the surface of specimen.

The technical solution of the invention is as follows:

A digital image measurement system device for the surface deformation of specimen based on sub-pixel corner detection is composed of an image pressure cell, a complementary metal-oxide-semiconductor (CMOS) camera, a camera bracket 15, a flexible lens hood 14 and a computer.

The image pressure cell is composed of an image pressure cell pedestal 1, a specimen pedestal 2, flat mirrors 3, a cylindrical specimen 4, a specimen cap 5, circular light-emitting diodes (LEDs) 6, an image pressure cell cover 9, a semi-cylindrical cavity 10, and a piece of flat tempered glass 11. The image pressure cell is different from traditional cylindrical pressure cell. The front panel of the image pressure cell is a piece of flat tempered glass 11 which is fixedly connected with the semi-cylindrical cavity 10 that forming a sealed pressure chamber. There are two flat mirrors 3 are settled at a 120° angle inside the pressure chamber at the back of the cylindrical specimen 4. The cylindrical specimen 4 is fixed on the specimen pedestal 2, while the specimen pedestal 2 is mounted on the image pressure cell pedestal 1, and there is a specimen cap 5 mounted on the top of the cylindrical specimen 4 to transfer the load of the loading rod 8. If the cylindrical specimen 4 is a kind of granular material, it would be wrapped in a black rubber membrane, on which white grids are printed; if the cylindrical specimen 4 is a kind of continuum solid material, then white grids are printed on its surface. In this manner, the whole surface of the cylindrical specimen 4 is divided into grids and discretized into several four-node finite elements; corners of the grids are the nodes of the finite elements; the coordinate of each node is tracked and recorded by using sub-pixel recognition accuracy and then deformation process of each node can be obtained. The image pressure cell cover 9, with a through-hole in the middle, is mounted on top of the semi-cylindrical cavity 10, and the loading rod 8 is directed through a linear bearing 7 and through this through-hole. Specially designed circular light-emitting diodes (LEDs) 6 which are to withstand high pressure are placed on the inside top and bottom of the semi-cylindrical cavity 10 to ensure an unchanged lighting environment for photographing of the CMOS camera.

The image pressure cell is located on the universal material testing machine 12. The camera bracket 15 is fixed on the vertical shaft 13 of the universal material testing machine 12, which can rotate freely so that to facilitate the disassembly of the experiment. The flexible lens hood 14 is connected with the image pressure cell and the camera bracket 15 and is used to shield external light interference; one end of the flexible lens hood 14 is fixed to the camera bracket 15, and the other end is freely adjustable. The flexible lens hood (14) is manually installed on the flat tempered glass (11) during the experiment and removed at the end of the experiment. The CMOS camera is fixed on the camera bracket 15 and its position is adjustable. It is located in front of the pressure cell, and the optical axis of the camera is perpendicular to the flat tempered glass 11 of the front panel of the image pressure cell. Then the image of the whole surface of the specimen is captured simultaneously by the two flat mirrors 3 of the image pressure cell coordinated with the CMOS camera. Finally, the computer displays the image in real time after processing.

A kind of digital image measurement method for the surface deformation of specimen based on sub-pixel corner detection, is characterized in that taking the white grids on the cylindrical specimen (4) as identifying features and tracking and recording the nodes in real time by using a sub-pixel corner detector algorithm; and, the image of the whole surface of the specimen is captured simultaneously by the two flat mirrors (3) of the image pressure cell; at the meantime monitoring axial strain, radial strain and volumetric strain of the cylindrical specimen (4); obtaining partial and whole strain fields of the specimen according to displacement of the nodes by introducing finite element method and finally the deformation of the whole surface of the cylindrical specimen (4) can be obtained. The detailed measurement process is as follows:

1) Installing the Cylindrical Specimen (4)

The cylindrical specimen (4) is installed between the specimen pedestal (2) and the specimen cap (5) of the image pressure cell; taking the grids on the cylindrical specimen (4) as identifying features and the features are facing the complementary metal-oxide-semiconductor camera; images captured by the two flat mirrors (3) behind the cylindrical specimen (4) is required to be symmetrically distributed to ensure that the coordinate of each corner of the grid on the cylindrical specimen (4) is tracked and recorded in real time by the CMOS camera with sub-pixel recognition accuracy;

2) Adjusting the CMOS Camera

Adjusting the camera bracket 15 by rotating the vertical shaft 13, including the adjusting the angle of rotation and the height of the camera. It is required that the cylindrical specimen 4 and images captured by the two flat mirrors 3 are all located in the window of the camera and occupy the best range of the camera window. Then, the flexible lens hood 14 is installed on the front panel of the pressure cell to isolate external light. Fine-tuning the universal material testing machine 12 so that the loading rod 8 can slowly contact with the specimen cap 5.

Adjusting the aperture and focal length of the camera to make the images shot by the CMOS camera and then conducting "Start Selecting Points". "Start Selecting Points" is to check the preparatory work in the early stage of the experiment, which requires that all nodes can be identified, and "Start Selecting Points" has good repeatability. If the "Start Selecting Points" effect is not good, the users need to adjust the aperture and focal length of the camera to achieve a satisfactory "Start Selecting Points" effect.

3) Starting Experiment

After conducting "Start Selecting Points", setting necessary parameters of the experiment, and it can be chose that whether to save the images captured in the experiment; starting the experiment and measurement process and the real-time deformation of the whole surface of the cylindrical specimen 4 can be obtained, which is convenient for experimenters to grasp the deformation trend of the experiment process; disassembling the whole measurement device after the experiment.

The data of the deformation of the whole surface of the cylindrical specimen 4 are processed as follows: first, spreading the curved images of the front surface of the cylindrical specimen 4 shot by the CMOS camera and rear surface of the cylindrical specimen 4 captured by two flat mirrors 3 and projecting them on the X-Y plane; second, conducting splicing and error correction on these three images; because there are overlapping columns in the edges of the three images, the unit node image on the whole surface of the specimen is obtained and the nodes are renumbered; finally, calculating the strain filed of the whole surface of the specimen and whole strain filed by using finite element method based on four-node isoparametric element according to the displacement of the nodes. Monitoring axial strain, radial strain and volumetric strain of the specimen in real time and obtaining the deformation of the whole surface of the cylindrical specimen 4.

The fundamental of node detection in this invention is as follows: node point is a basic local feature of the image, which is closely related to the shape of the object in the image. In computer digital image processing, the definition of node points has different descriptions, such as: point with high enough curvature on the image boundary; the point where the curvature changes obviously on the image boundary; the point where the direction of the image boundary changes discontinuously; the point in the image where the gradient value and the gradient change are obvious and so on. Then, according to the gray-scale function model of the image and the selected feature conditions, the feature points that meet the conditions are found out through continuous iterative operations as the undetermined corners.

The fundamental of detecting sub-pixel corners in this invention is as follows: when the image acquisition equipment has a certain pixel value, the measurement accuracy can be greatly improved by sub-pixel technology. The detection of sub-pixel corners is to determine the sub-pixel precision position of corners in gray-scale images through the iterative algorithm, as shown in the following figures. Assuming that the exact position of the corner is at point q, then any vector that points from q to another point in its neighborhood is perpendicular to the image gray gradient at pi. Because of the noise, the dot product of the two vectors is not equal to 0, resulting in error $\varepsilon_i$.

$$\varepsilon_i = \nabla(I)^T \bullet (q - p_i)$$

where $\nabla(I)^T$ is the image gray gradient at $p_i$. The value of the point q should be the coordinate of the point which can minimize $\varepsilon_i$. Then, the simultaneous equations containing all the $p_i$ points in the detection area (assuming there are n points) are converted to solve the problem for X so as to minimize AX=b. Here A is the matrix of $\nabla(I)^T$, and b is the column vector of $\nabla(I)^T$. When $x=(A^T A)_{-1} A^T b$, the $\|Ax-b\|$ can be minimized. In this way, a new point q is obtained. The algorithm takes the new point q as the center of the area and continues to use this method for iterative operation to obtain a higher sub-pixel accuracy. Conducting iterative operation until the center q is kept in a given threshold range and finally, the point q is determined.

The measuring accuracy of the present invention: the measuring accuracy is an important standard to measure a measuring method, and the factors affecting the measuring accuracy include lens distortion, size error of the calibrated specimen, noise interference of the measuring environment, etc. In order to accurately calibrate the measurement accuracy of this measurement method, and to correct the above mentioned factors, a built-in cold light source is used to effectively avoid the influence of changes in external light on the experiment. Through a large number of calibration tests, with 95% test results guarantee rate, this method finally obtains a strain measurement accuracy of $10^{-5}$.

The beneficial effects of the invention are as follows: (1) non-contact measurement, which does not disturb the specimens and does not disturb its deformation; (2) edge detection and feature point identification based on sub-pixel can track the deformation of feature points in real time to realize the observation of the whole surface deformation of specimens; (3) it can be directly applied to the deformation measurement of unsaturated soil specimens; (4) synchronous measurement of axial deformation and annular deformation; (5) arbitrarily select the measurement section or part; (6) detailed characteristics and shear failure process can be studied; (7) automatic identification and recording of measuring points improve data sampling frequency and reduce labor intensity of users; (8) digital image processing technology can record the whole deformation measurement process of the test in the form of pictures, which is convenient for re-analysis and study of deformation of specimen after the end of the test; (9) higher measuring accuracy, simple installation and strong environmental applicability.

DRAWINGS

Figure 1:
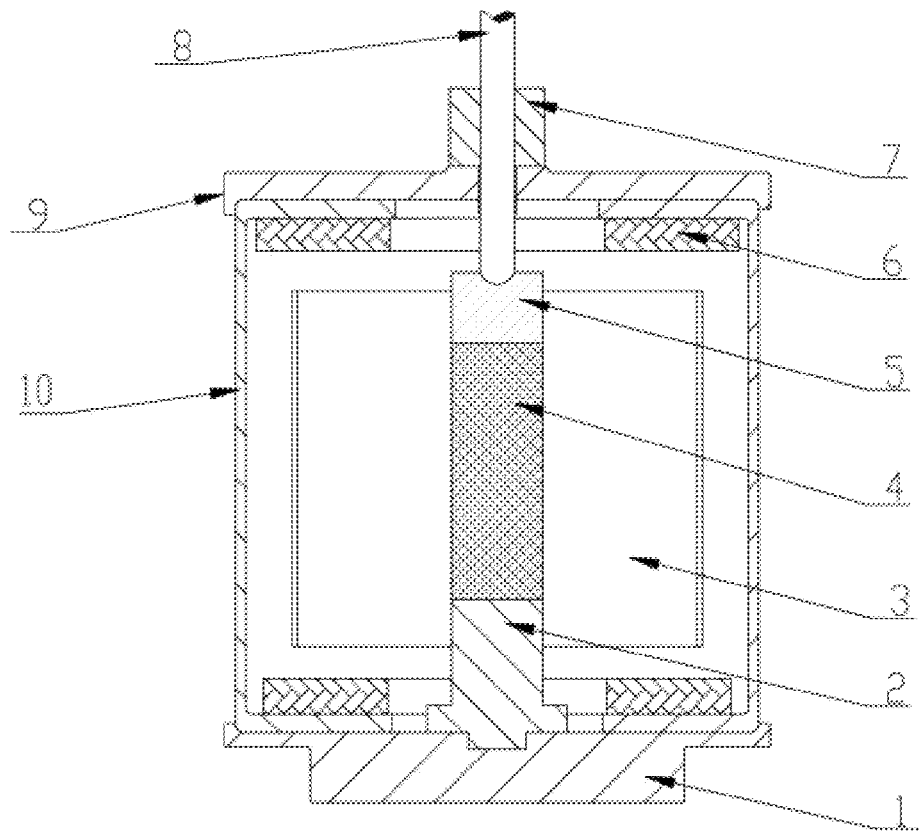
FIG. 1 is the longitudinal sectional view of image pressure cell.
Figure 2:
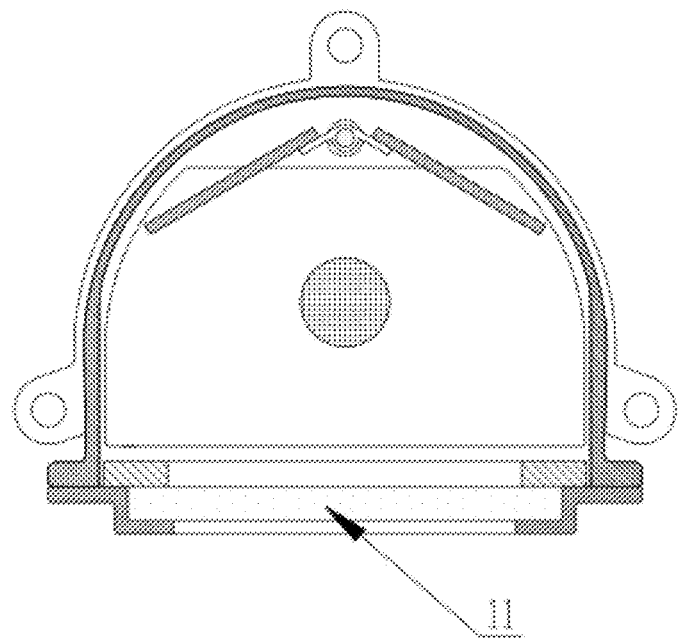
FIG. 2 is the cross sectional view of image pressure cell.
Figure 3:
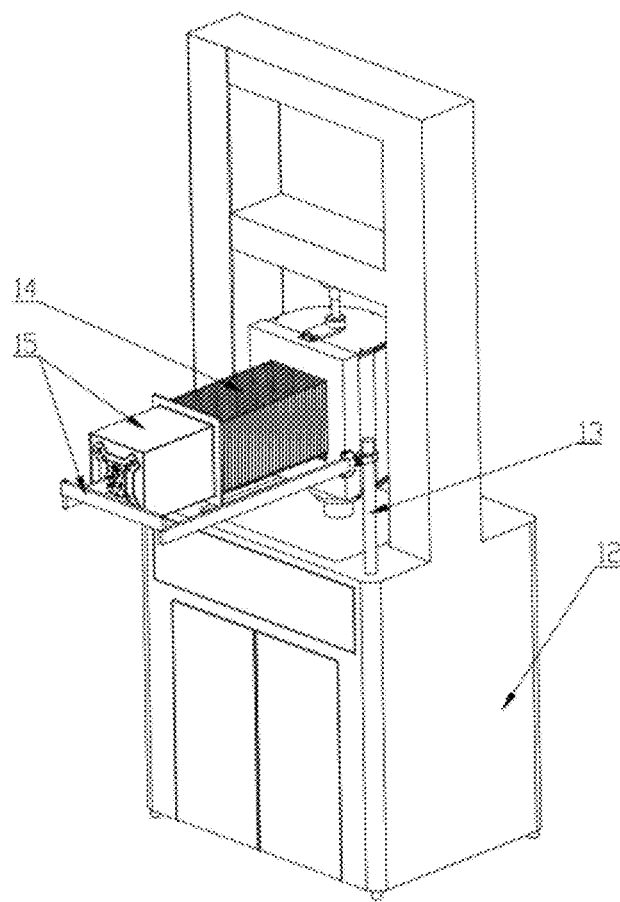
FIG. 3 shows the use of the measurement method.
Figure 4:
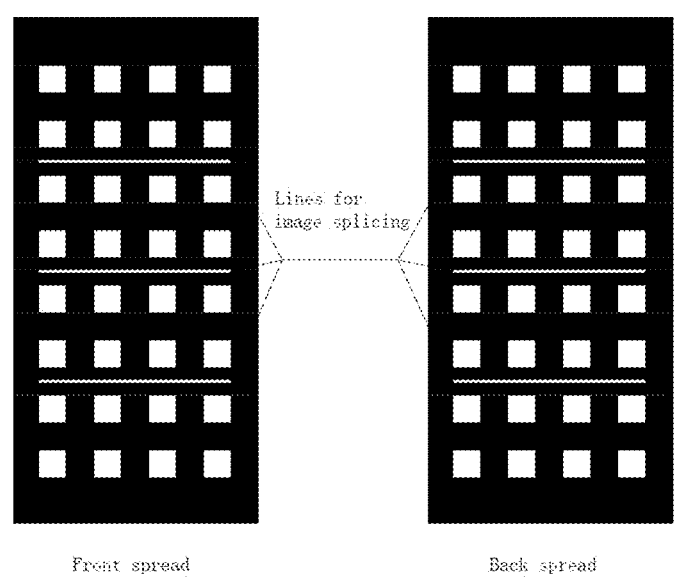
FIG. 4 shows the identifying feature points on the specimen.
Figure 5:
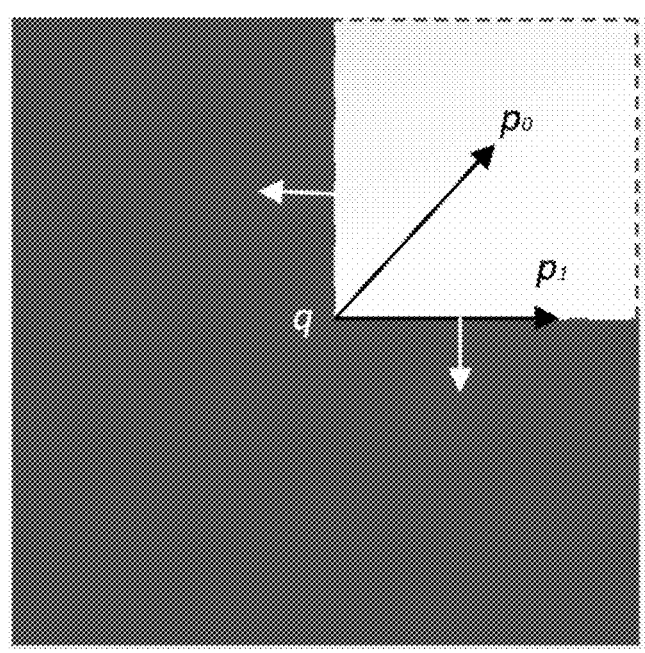
FIG. 5 is a schematic diagram of sub-pixel corner detection.

Where: 1 image pressure cell pedestal, 2 specimen pedestal, 3 flat mirrors, 4 cylindrical specimen, 5 specimen cap, 6 circular light-emitting diodes (LEDs), 7 linear bearing, 8 loading rod, 9 image pressure cell cover, 10 semi-cylindrical cavity, 11 flat tempered glass, 12 universal material testing machine, 13 vertical shaft 14 flexible lens hood, 15 camera bracket.

DETAILED DESCRIPTION

The following is a further explanation of the invention in combination with the attached drawings.

An image measurement device for the surface deformation of specimen based on sub-pixel corner detection is composed of an image pressure cell, a complementary metal-oxide-semiconductor camera, a camera bracket 15, a flexible lens hood 14 and a computer.

The front panel of the image pressure cell is a piece of flat tempered glass 11 which is fixedly connected with semi-cylindrical cavity 10 that forming a sealed pressure chamber; there are two flat mirrors 3 are settled at a 120° angle inside the pressure chamber at the back of the cylindrical specimen 4. The cylindrical specimen 4 is fixed on the specimen pedestal 2, while the specimen pedestal 2 is mounted on image pressure cell pedestal 1 by thread, and there is a specimen cap 5 mounted on the top of the specimen. The cylindrical specimen 4 would be wrapped in a black rubber membrane, on which some white grids were printed. The image pressure cell cover 9, with a through-hole in the middle, is mounted on top of the semi-cylindrical cavity 10, and the loading rod 8 is directed through a linear bearing 7 and through this through-hole. There are two sets of circular light-emitting diodes (LEDs) 6 which are specially designed to withstand high pressure are placed on the inside top and bottom of the semi-cylindrical cavity 10. The image pressure cell is located on the universal material testing machine 12. A camera bracket 15 is fixed on the vertical shaft 13 of the universal material testing machine 12. The camera is fixed on the camera bracket 15 with an adjustable position and located directly in front of the image pressure cell. The optical axis of the camera is perpendicular to the flat tempered glass 11 and communicates with the computer.

A digital image measurement system device for the surface deformation of specimen based on sub-pixel corner detection comprises steps as follows:

(1) Installing the Cylindrical Specimen

The cylindrical specimen 4 is granular material, wrapped in a black rubber membrane, on which 64 (8 rows and 8 columns) white grids were printed as identifying features and the size of each grid is 7 mm×7 mm) The cylindrical specimen 4 is fixed between the specimen pedestal 2 and the specimen cap 5 in the image pressure cell. The identifying features of the cylindrical specimen 4 face the CMOS camera, and images captured by the two flat mirrors 3 behind the cylindrical specimen 4 is symmetrically distributed.

(2) Adjusting the CMOS Camera

Adjust the camera bracket 15 by rotating the vertical shaft 13 to ensure that the cylindrical specimen 4 and images captured by the two flat mirrors 3 are all located in the window of the camera and occupy the best range of the camera window. Then, the flexible lens hood 14 is installed on the front panel of the pressure cell to isolate external light. Fine-tuning the universal material testing machine 12, so that the loading rod 8 can slowly contact with the specimen cap 5. Adjusting the aperture and focal length of the camera to make the resulting image bright and clear and then conducting "Start Selecting Points".

(3) Starting Experiment and Process

After conducting "Start Selecting Points", setting necessary parameters of the experiment on the interface of the measurement software, and it can be chose that whether to save the images captured in the experiment; starting the experiment and measurement process and the real-time deformation of the whole surface of the cylindrical specimen 4 can be displayed by the measurement software automatically, which is convenient for experimenters to grasp the deformation trend of the experiment process; disassembling the whole measurement device after the experiment.

The invention claimed is:

1. A digital image measurement method for a surface deformation of specimen based on sub-pixel corner detection, wherein, taking grids of a specimen as identifying features and tracking and recording nodes in real time by using a sub-pixel corner detector algorithm; and, an image of the whole surface of the specimen is captured simultaneously by two flat mirrors of an image pressure cell; at the meantime monitoring axial strain, radial strain and volumetric strain of the specimen; obtaining partial and whole strain fields of the specimen according to displacement of the nodes by introducing finite element method and finally deformation of the whole surface of the specimen can be obtained; detailed measurement process is as follows:

1) installing the specimen the specimen is installed between a specimen pedestal and a specimen cap of the image pressure cell; taking grids on the specimen as identifying features and the features are facing a complementary metal-oxide-semi conductor camera; images captured by the two flat mirrors behind the specimen is required to be symmetrically distributed to ensure that a coordinate of each corner of the grid on the specimen is tracked and recorded in real time by the complementary metal-oxide-semiconductor camera with sub-pixel recognition accuracy;

2) adjusting the complementary metal-oxide-semiconductor camera adjusting a camera bracket through a vertical shaft, including adjusting an angle of rotation and height of the camera; the specimen and images captured by the two flat mirrors are all located in a window of the complementary metal-oxide-semiconductor camera; then, a flexible lens hood is installed on the front panel of the image pressure cell to shield external light; fine-tuning a universal material testing machine, so that a loading rod can slowly contact with a specimen cap; adjusting aperture and focal length of the complementary metal-oxide-semi conductor camera to make a resulting image bright and clear; conducting" Start Selecting Points" in advance; all corners of "Start Selecting Points" can be identified and "Start Selecting Points" have good repeatability;

3) starting experiment after conducting "Start Selecting Points" in advance, starting the experiment and measurement; the image of the front surface of the specimen is captured by the complementary metal-oxide-semiconductor camera; the deformation of the whole surface of the specimen is captured by the two flat mirrors which are at an 120° angle behind the specimen; finally, conducting splicing and error correction on three images and the real time deformation of the whole surface of the specimen is obtained, achieving observation of the deformation of the whole surface; disassembling the whole measurement device at the end of the experiment;

the measurement method is implemented based on a measurement device, including an image pressure cell, a complementary metal-oxide-semiconductor camera and a computer;

the image pressure cell is composed of an image pressure cell pedestal, a specimen pedestal, flat mirrors, a specimen, a specimen cap, a semi-cylindrical cavity, a piece of flat tempered glass; a front panel of the image pressure cell is a piece of flat tempered glass which is fixedly connected with the semi-cylindrical cavity forming a sealed pressure chamber; there are two flat mirrors at a 120° angle inside the pressure chamber at a back of the specimen; the specimen is printed with white grids or is wrapped in a black rubber membrane which is printed with white grids and fixed on the specimen pedestal, while the specimen pedestal is mounted on the image pressure cell pedestal, and there is a specimen cap mounted on a top of the specimen to transfer a load of the loading rod; the whole surface of the specimen is divided into grids and discretized into several four-node finite elements; corners of the grids are the nodes of the finite elements; the coordinate of each node is tracked and recorded by using sub-pixel recognition accuracy and then deformation process of each node can be obtained;

the image pressure cell is located on the universal material testing machine; a camera bracket is fixed on a vertical shaft of the universal material testing machine, and can rotate freely on the vertical shaft; a complementary metal-oxide-semiconductor camera is fixed on the camera bracket and its position is adjustable; the complementary metal-oxide-semi conductor camera is located in front of the image pressure cell, and its optical axis is perpendicular to the flat tempered glass of the front panel of the image pressure cell; then the image of the whole surface of the specimen is captured simultaneously by the two flat mirrors of the image pressure cell coordinating with the complementary metal-oxide-semiconductor camera; finally, the computer displays the image in real time after processing;

the sub-pixel corner detector algorithm is as follows:

the detection of sub-pixel corners is to determine the sub-pixel precision position of corners in gray-scale images through an iterative algorithm; assuming that an exact position of the corner is at point q, then any vector that points from q to another point in its neighborhood is perpendicular to the image gray gradient at pi; because of noise, the dot product of the two vectors is not equal to 0, resulting in errors $\varepsilon_i$:

$$\varepsilon_i = \nabla(I)^T \bullet (q - p_i)$$

where $\nabla(I)^T$ is the image gray gradient at pi; the value of the point q should be the coordinate of the point which can minimize $\varepsilon_i$; then, simultaneous equations containing all the $p_i$ points in the detection area, assuming there are n points, are converted to solve for X so as to minimize AX=b; here A is the matrix of $\nabla(I)^T$, and b is the column vector of $\nabla(I)^T$; when $x=(A^T A)^{-1} A^T b$, the $\|Ax-b\|$ can be minimized; in this way, a new point q is obtained; the algorithm takes the new point q as the center of the area and continues to use this method for iterative operation to obtain a higher sub-pixel accuracy; conducting iterative operation until the center q is kept in a given threshold range and finally, the point q is determined.

2. The digital image measurement method for the surface deformation of specimen based on sub-pixel corner detection according to claim 1, wherein, it also comprises a flexible lens hood; the flexible lens hood is used to shield external light interference and its one end is fixed to the camera bracket; the other end is freely adjustable; the flexible lens hood is manually installed on the flat tempered glass during the experiment and removed at the end of the experiment.

3. The digital image measurement method for the surface deformation of specimen based on sub-pixel corner detection according to claim 1, wherein, circular light-emitting diodes are specially designed to withstand high pressure and placed on the top and bottom of the semi-cylindrical cavity to ensure an unchanged lighting environment for photographing of the complementary metal-oxide-semiconductor camera.

* * * * *